(12) United States Patent
Miller et al.

(10) Patent No.: US 9,389,709 B2
(45) Date of Patent: *Jul. 12, 2016

(54) MULTI-FUNCTION TABLET PEN INPUT DEVICE

(71) Applicant: INTEL CORPORATION, Santa Clara, CA (US)

(72) Inventors: Thurman Miller, North Plains, OR (US); Terry Dishongh, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/681,792

(22) Filed: Apr. 8, 2015

(65) Prior Publication Data

US 2015/0212607 A1 Jul. 30, 2015

Related U.S. Application Data

(63) Continuation of application No. 11/770,345, filed on Jun. 28, 2007, now Pat. No. 9,019,245.

(51) Int. Cl.
*G06F 3/033* (2013.01)
*G06F 3/0354* (2013.01)

(52) U.S. Cl.
CPC .......... *G06F 3/03545* (2013.01); *G06F 3/0354* (2013.01)

(58) Field of Classification Search
CPC ............................. G06F 3/033; G06F 3/0354
USPC .............................. 345/179; 178/19.01–19.07
See application file for complete search history.

(56) References Cited

U.S. PATENT DOCUMENTS

| | | | |
|---|---|---|---|
| 6,215,480 B1 | 4/2001 | Danis et al. |
| 6,515,651 B1 | 2/2003 | Berstis |
| 7,046,237 B1 | 5/2006 | Nicolas et al. |
| 2003/0053840 A1 | 3/2003 | Lapstun et al. |
| 2003/0107553 A1 | 6/2003 | Yueh |
| 2004/0012574 A1 | 1/2004 | Sharma |
| 2004/0012575 A1 | 1/2004 | Homer et al. |
| 2005/0057534 A1 | 3/2005 | Charlier |
| 2005/0223315 A1 | 10/2005 | Shimizu et al. |
| 2006/0012577 A1 | 1/2006 | Kyrola |
| 2007/0030257 A1 | 2/2007 | Bhogal et al. |
| 2007/0288937 A1 | 12/2007 | Durojiye et al. |
| 2008/0036747 A1 | 2/2008 | Hope |
| 2008/0243541 A1 | 10/2008 | Felton et al. |

*Primary Examiner* — Jonathan Boyd

(74) *Attorney, Agent, or Firm* — Pillsbury Winthrop Shaw Pittman LLP

(57) ABSTRACT

This invention relates to the field of remotely controlling the mobile computing device. It further relates to an apparatus and method of at least replicating in a portable pen-like device the ability to control a portable computing device to the same extent as the level of control attainable by a standard PC keyboard when attached to a standard PC; and relates to various embodiments of the apparatus and method.

18 Claims, 5 Drawing Sheets

Tablet Pen Apparatus.

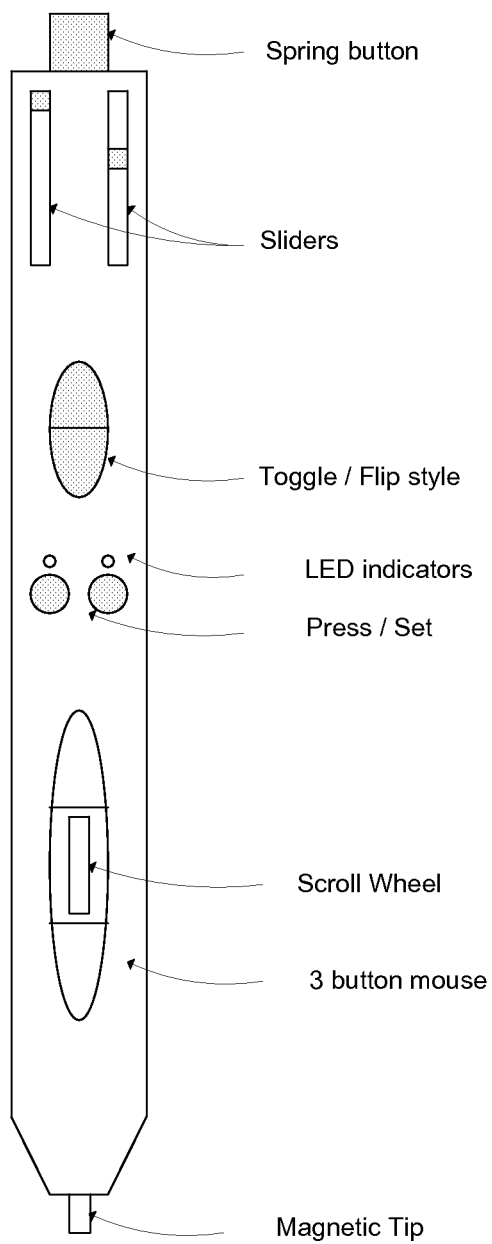
Figure 1. Tablet Pen Apparatus.

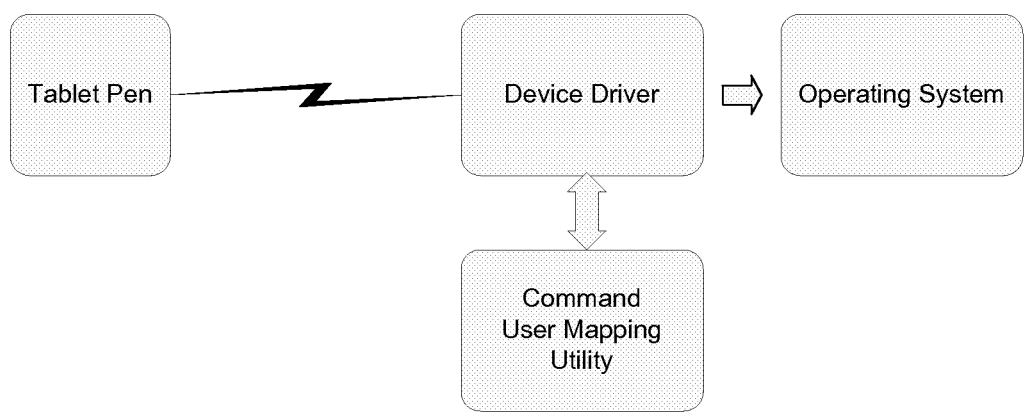
Figure 2. Method of Control of a Tablet Pen.

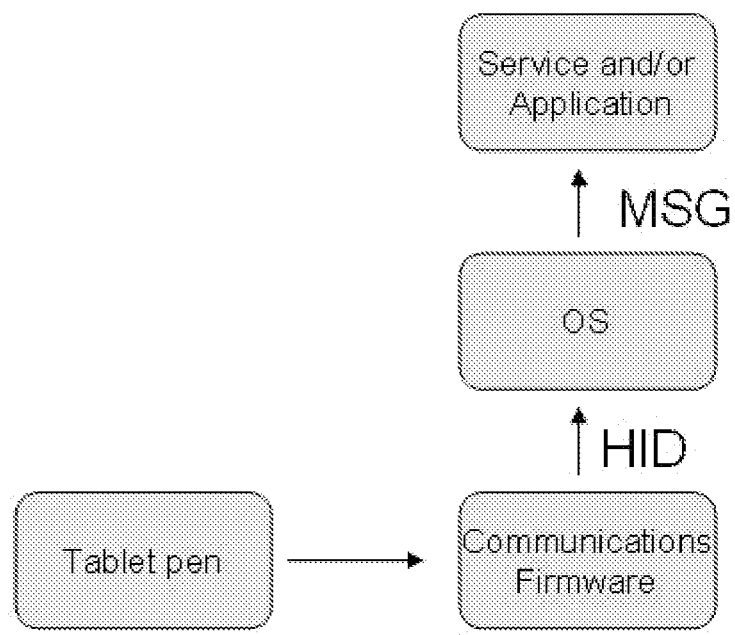
Figure 3. Method of Control of a Tablet Pen at the Chip Level.

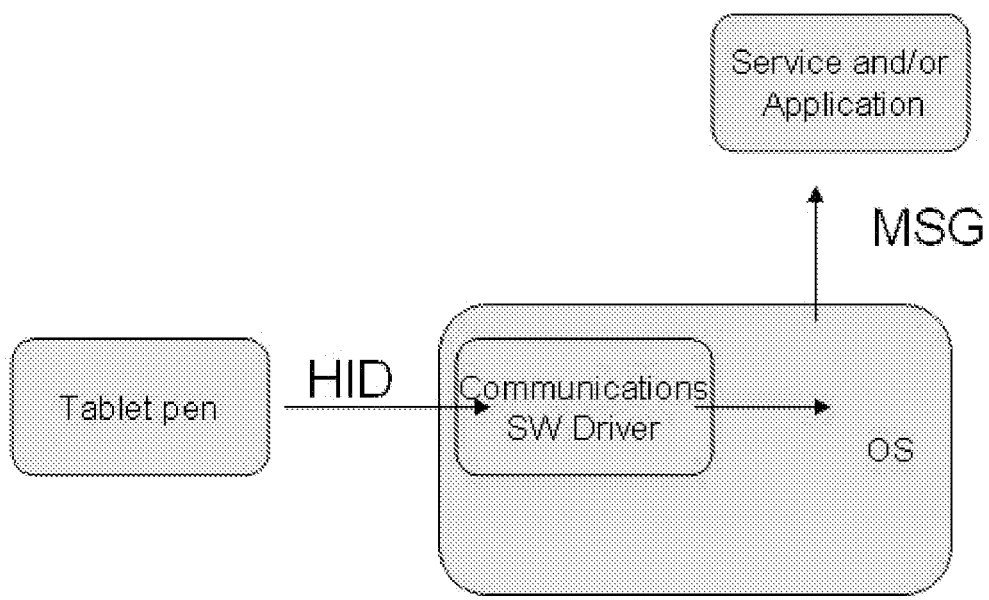
Figure 4. Method of Control of a Tablet Pen a the Software Driver Level.

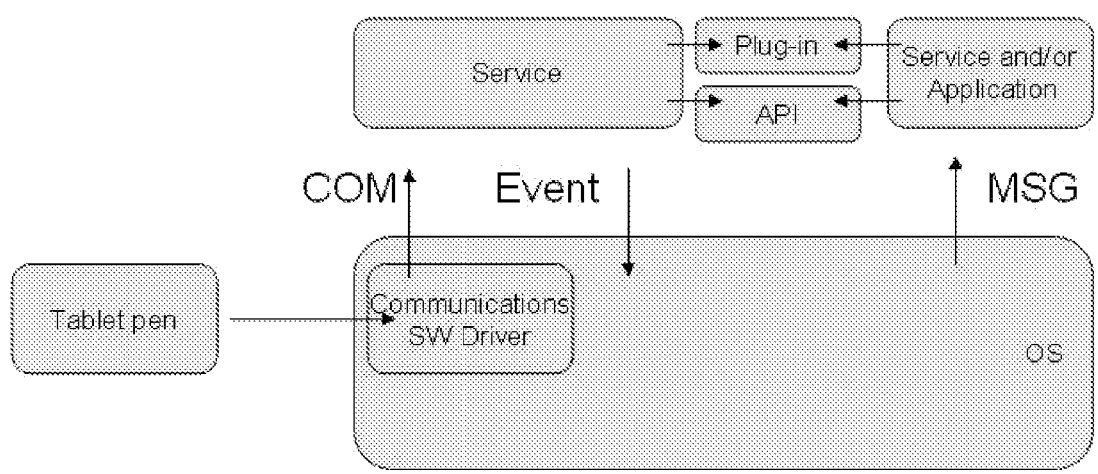
Figure 5. Method of Control of a Tablet Pen at the Software Level with Firmware Support.

MULTI-FUNCTION TABLET PEN INPUT DEVICE

CROSS-REFERENCE TO RELATED APPLICATION

This application is a continuation of pending U.S. application Ser. No. 11/770,345 filed on Jun. 28, 2007, the entire contents of which are herein incorporated by reference in its entirety.

FIELD OF THE INVENTION

The embodiments of the invention relate to devices and methods for a mobile computing device.

BACKGROUND

In the state of the art mobile computing devices, neither the stylus nor the conventional tablet pens allow for full control of the tablet PC, but merely allows selection of a command from a menu of commands offered by the operating system of the tablet PC. Thus, a need exists for a more robust control capability of a portable computing device such as a tablet PC.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

FIG. 1 is a perspective view of an embodiment of the apparatus of this invention.

FIG. 2 is a software functional block diagram, showing the interaction between major components of the software at a high level.

FIG. 3 depicts the software block diagram at chip level, eg "centrino", custom Blue tooth, or similar where HID messages are raised by the firmware to the OS which then distributes to all applications as an OS event.

FIG. 4 depicts the software block diagram at the software driver level, e.g., HID over Blue tooth, or similar where the communications are done using HID messages and passed through to the OS and distributes to all applications as an OS event.

FIG. 5 depicts the software block diagram at the software driver level, utilizing a mechanism such as serial, or similar where the communications are done directly to the firmware on the tablet pen and then the service would push specific events back down to the OS to be distributed to other applications.

DETAILED DESCRIPTION OF THE INVENTION

As used in the specification and claims, the singular forms "a," "an," and "the" include plural references unless the context clearly dictates otherwise. For example, the term "an array" may include a plurality of arrays unless the context clearly dictates otherwise.

The embodiments of the invention relate to the input device for a mobile computing device. Illustrative of such mobile computing devices are tablet-style personal computers designed to communicate wirelessly with medical devices such as stethoscopes, blood pressure monitors, vital signs monitors, and other various medical testing instruments in a clinical or hospital environment, while being convenient to hold and operate, and resistant to penetration by fluids.

The embodiments of the invention further relate to the field of remotely controlling the mobile computing device. More specifically, this invention relates to an apparatus and method of at least replicating in a portable pen-like device the ability to control a portable computing device to the same extent as the level of control attainable by a standard PC keyboard when attached to a standard PC.

The term "computer" may include at least one central processing unit or CPU (processor) connected to a host bus. The CPU may be any of various types, including an x86 processor, e.g., a Pentium class, a PowerPC processor, a CPU from the SPARC family of RISC processors, as well as others. The computer system may also include various memory mediums, typically including RAM and referred to as main memory. The main memory may store one or more programs implementing the present invention. The main memory may also store operating system software, as well as other software for operation of the computer system.

A class of personal computers which is smaller than the typical "desktop" or "laptop" devices is known in the art as "tablet" personal computers, or tablet PCs. Such computing devices are generally known for use as personal digital assistants and as specialized, mobile computers. Tablet PCs typically offer the advantage of a small form factor that is easy for the user to carry, but at the cost of limited utility with respect to their full-sized counterparts. As used herein, the term tablet PC refers to a computer, such as a personal computer, incorporating various convenient and intuitive aspects of pencil and paper into a user's interaction with the computer. Tablet PC as used here also includes a type of mobile computer known as ultramobile PC (UMPC), characterized by the lack of a keyboard.

The information input/output characteristics of tablet PCs are completely different than conventional PCs. Tablet PCs lack keyboards and therefore commands that require keyboard input are impossible to do without custom programming or awkward user interaction. These include but are not limited to keyboard entries such as: CTRL/ALT/SHIFT/DEL/TAB/INSERT/etc.

On the other hand, tablet PCs provide a very natural way to interact with a computer, namely, by writing on it. Tablet PCs allow for capturing of handwritten notes so that users are able to take notes in their own handwriting, similar to taking handwritten notes with a pen and paper. Tablet PCs commonly include a stylus. A stylus secretes no ink and is used with a touch screen of the PC. A stylus permits data entry directly into the device via a digitizer, which is positioned behind the display screen to permit data entry by a user. The stylus is typically passive.

While providing the simplicity of pen and paper, tablet PCs have the potential to provide many features and benefits provided by word processors and other personal computer software, including sharing of notes among meeting participants in real-time during a meeting via a wireless communication link, for instance. Additional advantages over pen and paper include, but are not limited to, the ability to search notes for particular words, including "fuzzy finds," and the ability to input information in other ways including speaking and any other suitable means for inputting information.

Tablet PCs may also provide functions in specialized applications such as medical care. Such applications may be designed according to standards such has Clinical Context Object Workgroup (CCOW) Health Level Seven (HL7). CCOW HL7 is a vendor independent standard which allows clinical applications to share information at the point of care. CCOW HL7 uses "context management" to allow information in separate healthcare applications to be unified so that each individual application is referring to the same patient, encounter or user. When a clinician signs onto one application within a CCOW HL7 environment, and selects a patient, that same sign-on is simultaneously executed on all other applications within the same computing environment. This standard offers clinicians secure, unified access to disparate clinical data at the point of care, thereby improving efficiency.

Tablet PCs require a way to input information and user commands into them. Among other ways of entering textual information, users will often use the stylus, which was mentioned previously. Conventional styluses, such as those commonly used with a Personal Digital Assistant (PDA), may be removably attached to the tablet PC, may be tethered to the tablet PC, or may be completely independent of the tablet PC. The stylus, if stored, must be removed from its storage position to interact with the tablet PC.

Another input device for use with tablet PCs is referred to as a tablet pen, which provides for limited functionality beyond that of a stylus. Currently, tablet pens are very simple devices with at most two Press/Hold buttons to simulate the right/left mouse button. Current pens also utilize magnetic coupling which requires a very close proximity to the digitizer, in which a separation distance of 20-30 mm is typical.

The pen or stylus may be used to write on a display area of the tablet PC, or as a pointing device directly on the screen or above the screen. If pre-selected portions of the tablet PC screen have been designed as a menu for inputting user commands, then the stylus can be used to select the available commands by touching or pointing to the area of the screen dedicated to that command.

The embodiments of the present invention relates to an apparatus and method providing a new type of tablet pen, associated device driver, and method of providing communication between the Tablet Pen and the tablet PC. The Tablet Pen contains several type and quantities of user input controls such as buttons/sliders/spring button that communicate commands to the Tablet PC. These commands can be issued within a certain distance, but are not proximity based such as the magnetic tablet pens in use today. When activated, the Tablet Pen will send commands to the Tablet PC that can be interpreted by the Operating System. The user will have full control to map these buttons at an OS/Application level so that one button may mean one thing in one application, but an entirely different command in another application. The Tablet Pen may also utilize newer wireless communications methods providing increased operating range between the Tablet Pen and the tablet PC.

In one embodiment, the invention is directed to an apparatus for the control of a computer. Preferably, the apparatus is a Tablet Pen having input controls and the computer is a tablet PC. The input controls of the apparatus could include one or more switches allowing a user to select an input state from among a plurality of discrete choices of states, or could include one or more continuous selectors allowing a user to set or select an input state or input value from among a range of values, with sufficiently small difference between adjacent selectable values, so as to present an essentially continuous set of selectable values within the range of values.

The input controls of the apparatus may optionally include one or more of the following types of user-operated input controls:

Press and hold button switch controls, in which the pressing, holding, or length of hold can be used to select a temporary command, a temporary command being one which has effect only during the duration of the associated user interaction with the input control;

Interactive button, which operates like a press and hold button switch control, but with the difference that the action taken upon detection of the various types of user interaction will be under the control of software, and may be redefined based upon the computing state of either the tablet PC or the Tablet Pen;

Rocker switches, in which the switch pivots in order to select from a discrete number of positions, usually two positions, and which may optionally include a mechanical spring function that operates to return the rocker switch to a default position when the rocker switch is not actuated by the user;

Spring button switches, in which the switch operates in a linear motion in order to select from a discrete number of positions, but which is otherwise the same as a rocker switch;

Slider continuous selectors, in which an input control is adjusted by the user in a manner which appears to be continuous to the user, i.e., either the user does not perceive discrete steps between values selectable by the input control, or any discrete steps which the user may perceive (e.g., detents) will be closely spaced enough so that the user does not have a need to select a value in between the selectable values. The selection may be made within a range of allowable values, wherein the range may be fixed or may be under software control. The input control may operate to select a value through either mechanical or non-mechanical actuation of the input control. Examples of non-mechanical actuation include, but are not limited to, electrical, magnetic, or capacitive sensing;

Scroll wheel, which is a type of slider continuous selector, in which rotary motion is the user actuation that operates the input control;

The input controls of the apparatus may also optionally be arranged to duplicate the functionality of a conventional computer mouse.

The apparatus may also optionally include a magnetic tip.

The tablet PC may also include a device driver, which is software integrated with the operating system of the tablet PC. The device driver software would enable the tablet PC to recognize and act upon commands inputted by the user through the Tablet Pen, and may optionally enable transmission of one or more indicators to the Tablet Pen based on the computing state, computing results, or status of the tablet PC.

In another embodiment, the invention is directed to a method of fully controlling a Tablet PC within a certain distance, but are not proximity based like in the prior art.

The method of control of the Tablet Pen allows the ability to actuate one or more of the input controls in order to invoke a custom "sticky note" application so that users can write their notes down that are independent of any application currently running Sticky note software typically allows a user to enter notes in a freeform style. Optionally, attributes such as date, time and subject may be attached to the note to further describe it. The attributes may be entered by the user, or may be entered by utilizing a sharing capability provided by the software driver of the Tablet Pen, the sharing capability allowing the Tablet Pen to automatically attach various attributes to the note as it is written. The software driver of the Tablet Pen may use a communication standard such as HL7, or other standard providing similar functionality. The software driver of the Tablet Pen may interrogate the tablet PC operating system about other processes it is executing, and use this information to attach attributes to the user's notes. This sticky note ability allows users of the tablet PC and Tablet Pen to develop and use very individual, personalized systems for keeping of track of information, tasks, and what has been done with different patients. An embodiment of the present invention for use in the medical application arena may utilize the CCOW HL7 standard that could embed patient identification into the sticky note.

The present invention allows the ability to tie authentication at a user-ID level to the pen. An embedded ID, such as an RFID tag or a digital signature embedded in the memory of the Tablet Pen, could be used to identify the user of the tablet and only allow access to the tablet of the person holding the pen. To gain full access, the user would need to use a biometric characteristic for password. Examples of means for identification based on biometric passwords include by signature, password, fingerprint, or iris scan.

The present invention allows the ability to lock or shut-down the tablet PC when the Tablet Pen is no longer within close enough range to be able to communicate with the tablet PC. Since the lockout or shut-down function is in the tablet PC, and since this is activated when the Tablet Pen is no longer within range, the tablet PC must be able to detect the absence of communication from the Tablet Pen, or when such communication is received but at a signal level too low to provide reliable communications. One method would be if the Tablet Pen provides a periodic ping or "keep alive" signal to the portable computing device.

The present invention allows the ability to invoke a "lock tablet" functionality through the single actuation of a single input control.

The present invention allows the ability to use an RF-Location stack or be responsive to a paging signal from the tablet PC, thus generating an indicator in the Tablet Pen, for instance an audio or visual indicator. This functionality would be used by or actuated by the tablet PC in order to auto-locate the pen when commanded from the tablet PC. The paging signal may be individualized for a particular combination of portable computing device and Tablet Pen. The paging functionality could also operate in the reverse direction, so that the Tablet Pen sends a paging signal to the portable computing device, and upon receipt of the paging signal the potable computing device generates a human-perceivable signal.

In one embodiment of the invention, the Tablet Pen can communicate to the tablet PC using one or more of a variety of communication methods and protocols, such as: RF, IEEE Standard 802.15 for Wireless Personal Area Networks (also known as (ZigBee), Bluetooth, Infra-red (IR)/IRDA, or ultrasonic sound frequencies. These methods and protocols do not necessarily require line of sight access between the tablet PC and the Tablet Pen.

Yet another embodiment relates to a method for controlling a computer using a peripheral device containing various user input controls, the method comprising delivering a signal from a user input to a receiver of an embedded controller; generating an interrupt and identification of an event from the embedded controller to facilitate processing a peripheral event; raising notification of the peripheral event using an advanced configuration and power interface (ACPI) event and associated ACPI control methods; capturing the peripheral event with an operating system device driver that includes a device driver for the sensor; translating the peripheral event into a human interface device (HID) report that is read by an HID class driver; and sending an input message to application software that has registered an interest in the peripheral event.

In an embodiment of the invention utilizing Windows, the system includes three device drivers. They include an HID Class Driver, an ACPI-to-HID Mapper Driver, and an ACPI Class Driver. When the system boots, the ACPI-to-HID Mapper Driver loads and registers itself (using the label of "AHM") with the ACPI Class Driver, so that the ACPI Class Driver will know that when it receives AHM events from the embedded controller, to respond by invoking the ACPI-to-HID Mapper Driver. The ACPI-to-HID Mapper Driver will service Tablet Pen events from the embedded controller. The system designer must assign button numbers to all the buttons/switches on the system. For example, a Tablet Pen sensor could be designated as button #4 (the numbers are somewhat arbitrary, but should start at 1 and count up by ones). Tablet Pen events are delivered by the embedded controller as AHM events. In this example, when the ACPI-to-HID Mapper Driver receives notification of an AHM event, it calls BTNS (0) to determine which button/switch caused the AHM event and receives back a "4" to indicate that it was a Tablet Pen event.

After determining that a stylus event occurred, the ACPI-to-HID mapper driver reads a table (out of, for example, a Windows registry) describing which HID button codes are associated with button #4. For example, the Windows registry may indicate that button #4 should generate an HID "input report" with {HID page 12, HID usage 1, HID button usage 35} or other similar parameters. The control panel applet allows system administrators to select which HID button code will be assigned to a particular Tablet Pen event.

The interaction between the HID class driver and the application software, according to an embodiment of the invention, is as follows. Application software can "register" its interest in a particular button code, such as the stylus button code, with the HID class driver by using an application programming interface (API) provided by the operating system.

A wake sequence is initiated by the embedded controller. The firmware in the embedded controller is coded to cause the system to wake upon a Tablet Pen event. During a wake sequence, when the operating system is resumed from a sleeping state, it will send (broadcast) a "resumed" message to all running applications. When a stylus event occurs, the ACPI-to-HID mapper driver delivers the event to the HID class driver, who delivers it to the application software in the form of an input message, as well as a message buffer indicating that the input type was an HID event, and that it was the stylus button. Using these events, an application will understand that the system has reawakened, and that it was because of a Tablet Pen event. When the Tablet Pen event clears, another Tablet Pen event message will be sent. When any application has been programmed to cause the system to sleep upon a particular Tablet Pen event, upon receipt of the appropriate HID button code, the system initiates a suspend operation by calling the operation system's suspension API.

The present invention contemplates the user being able to enable or disable various capabilities of the tablet PC, such as the ability to wake up or to sleep upon a particular Tablet Pen event. For medical applications, the peripheral may include such devices as, for example, a wireless blood pressure gauge, a thermometer, or a wireless stethoscope. Other peripheral devices and features that might be incorporated into the platform include, but are not limited to, digital cameras, RFID readers, bar code readers, Bluetooth connectivity, audio I/O, a docking station which may include warm-swappable batteries.

Yet another embodiment of the method for control software services running within the tablet PC and Tablet Pen establish a communication using the protocol implemented above the operating system level, similar to that used for blue-tooth headsets. These services would interpret the commands and optionally raises these events to the Operating system. For example, not every event on the pen needs to be raised to the operating system ("OS") level for any application to read, for example, display zoom control, lighting and contrast of the display, or other application-specific events. Additionally, the pen may invoke commands to the operating system without invoking software at the ACPI or HID levels.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application may disclose several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Where the term "plurality" is used, that term shall be construed to include the quantity of one, unless otherwise stated. Finally, the entire disclosure of the patents and publications referred in this application are hereby incorporated herein by reference.

What is claimed is:

1. An apparatus comprising:
    a handheld body;
    a user-actuated input control on the handheld body;
    a CPU in communication with user-actuated input control, the CPU configured to translate a user input into a control signal to remotely control a program executing on a computing device, wherein the user input is generated in response to actuation of the user-actuated input control, the CPU is configured to provide a periodic ping signal to be transmitted to the computing device, wherein absence of the periodic ping signal at the computing device, when otherwise the computing device is receiving the periodic ping signal, activates a function to at least partially disable the computing device; and
    a transmitter arranged to communicate the control signal and the periodic ping signal to the computing device.

2. The apparatus of claim 1, wherein the CPU is configured to translate the user input into the control signal using an advanced configuration and power interface (ACPI) driver, a human interface device (HID) driver and an ACPI-to-HID driver.

3. The apparatus of claim 1, wherein the function causes to lock-out access to the computing device.

4. The apparatus of claim 1, wherein the function causes to shut down the computing device.

5. The apparatus of claim 1, wherein the user-actuated input control comprises at least one press and hold button switch control.

6. The apparatus of claim 1, wherein the user-actuated input control comprises at least one rocker switch.

7. The apparatus of claim 1, wherein the user-actuated input control comprises at least one spring button switch.

8. The apparatus of claim 1, wherein the transmitter is arranged to communicate the control signal using IEEE Standard 802.15.

9. The apparatus of claim 1, wherein the transmitter is arranged to communicate the control signal using Bluetooth.

10. The apparatus of claim 1, wherein the handheld body further comprises a memory configured to store an identification matched to an embedded ID associated with the computing device.

11. A method comprising:
    receiving a user input based on actuation of a user-actuated input control on a handheld device;
    translating, using a processor, the user input into a control signal to remotely control a program executing on a computing device;
    generating, using the processor, a periodic ping signal to be transmitted to the computing device, wherein absence of the periodic ping signal at the computing device, when otherwise the computing device is receiving the periodic ping signal, activates a function to at least partially disable the computing device; and
    transmitting the control signal and the periodic ping signal to the computing device.

12. The method of claim 11, wherein said translating comprising translating the user input into the control signal using an advanced configuration and power interface (ACPI) driver, a human interface device (HID) driver and an ACPI-to-HID driver.

13. The method of claim 11, wherein the function causes to lock-out access to the computing device.

14. The method of claim 11, wherein the function causes to shut down the computing device.

15. The method of claim 11, wherein the user-actuated input control comprises at least one of press and hold button switch control, rocker switch, or one spring button switch.

16. The method of claim 11, wherein said transmitting comprises the control signal using IEEE Standard 802.15.

17. The method of claim 11, wherein said transmitting comprises the control signal using Bluetooth.

18. The method of claim 11, further comprising storing, in a memory, an identification matched to an embedded ID associated with the computing device.

* * * * *